UNITED STATES PATENT OFFICE.

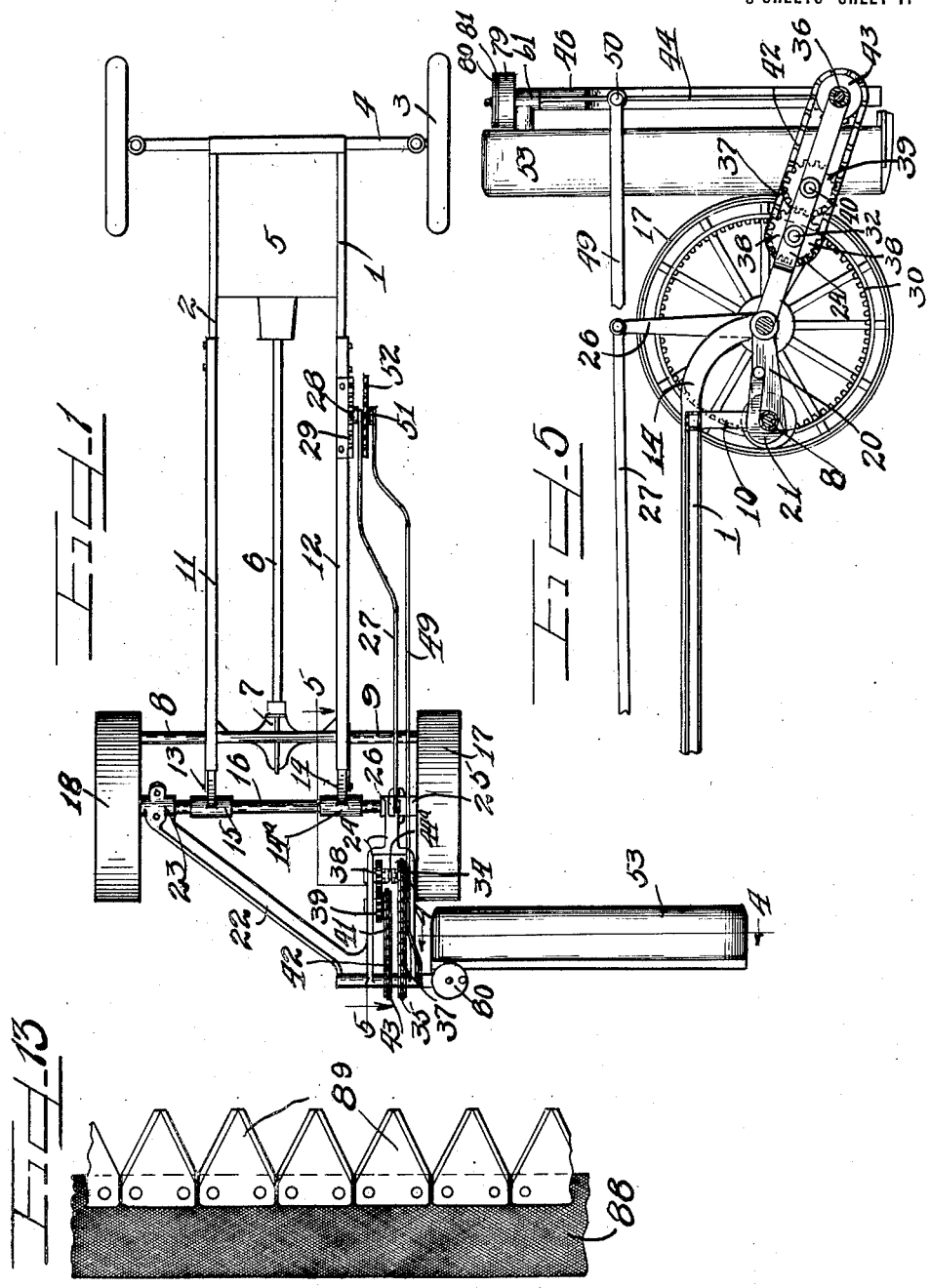

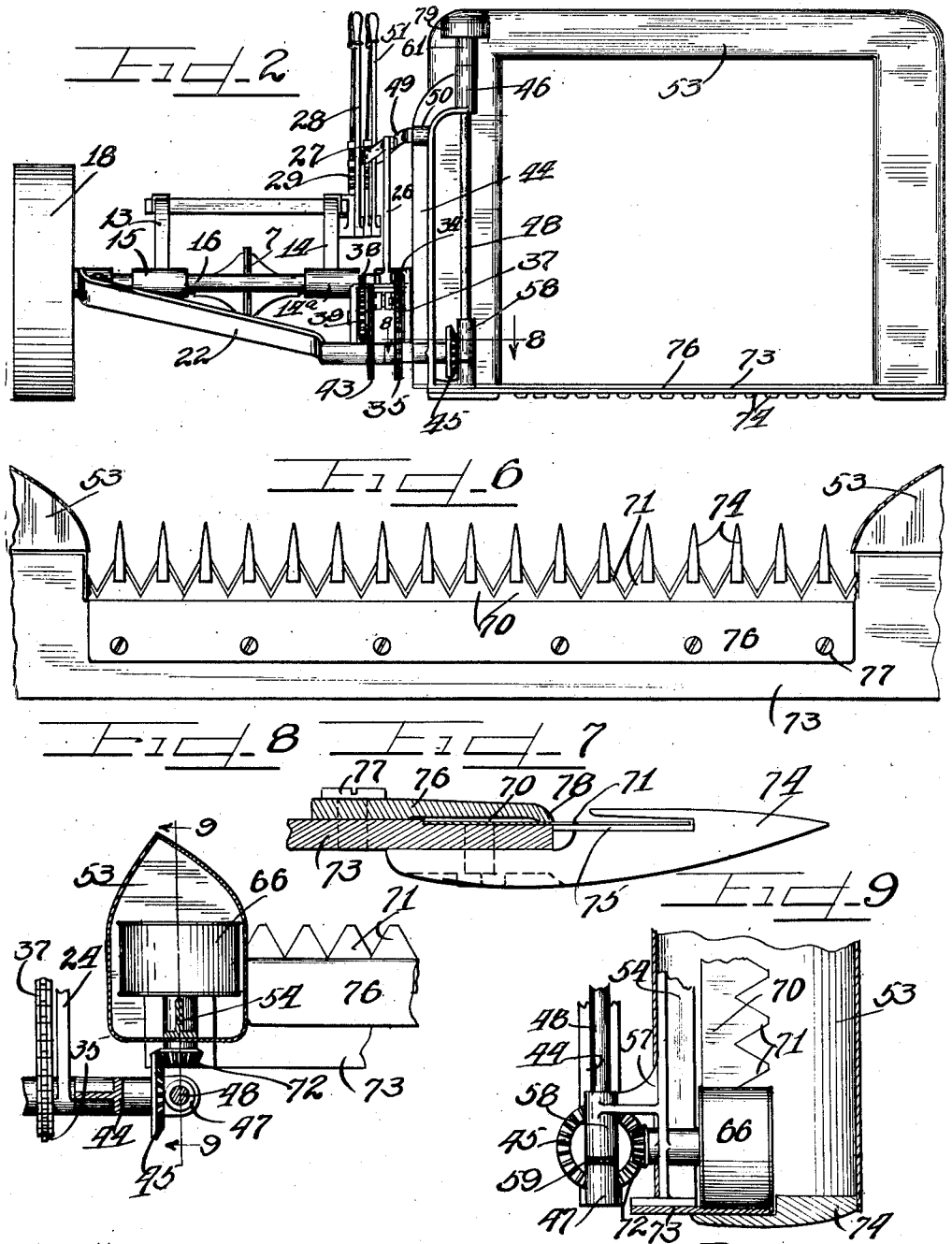

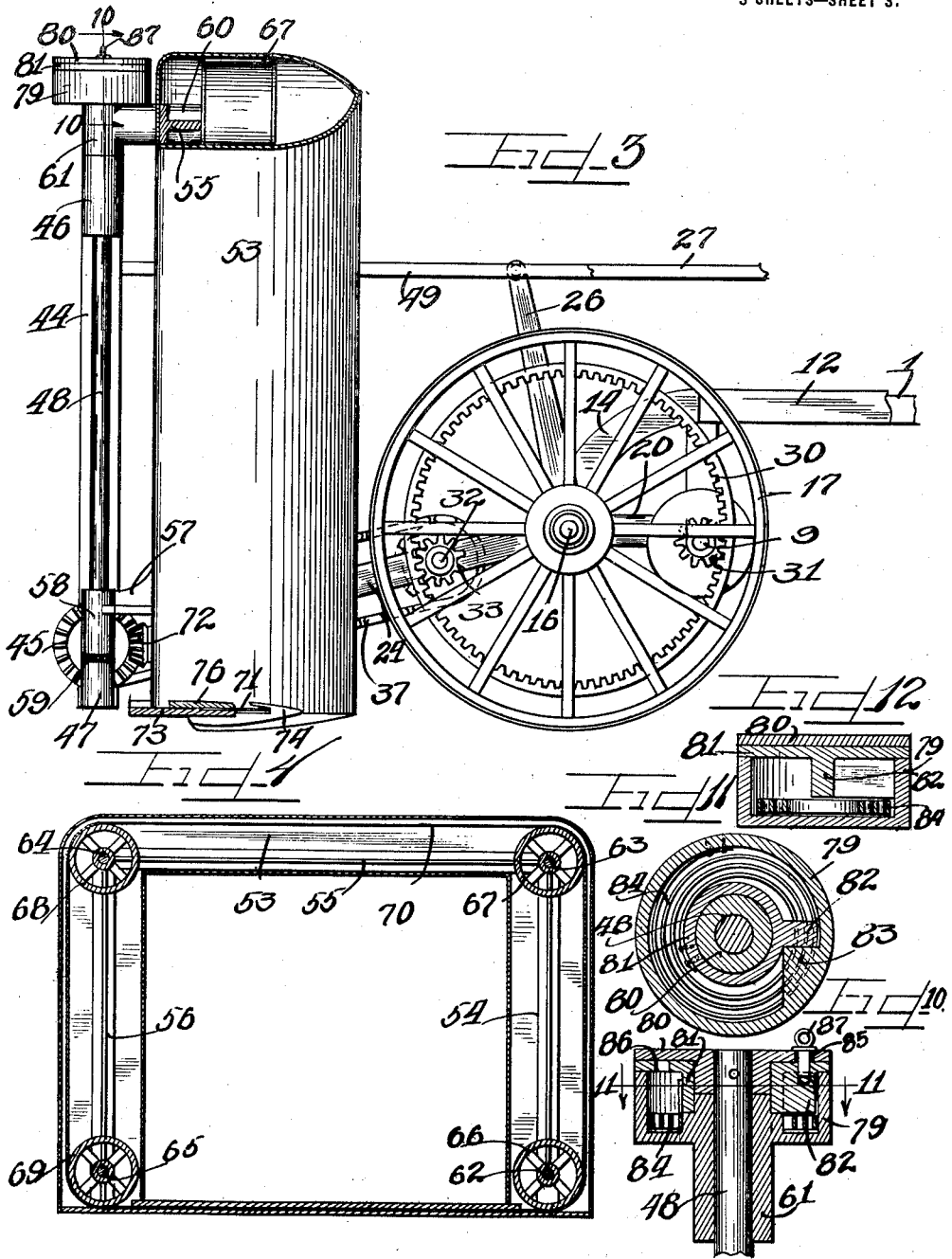

ALBERT EUGENE COOK, OF EVANSTON, ILLINOIS.

MOWER AND HARVESTING-MACHINE.

1,364,251.  Specification of Letters Patent.  Patented Jan. 4, 1921.

Application filed December 12, 1917. Serial No. 206,731.

*To all whom it may concern:*

Be it known that I, ALBERT E. COOK, a citizen of the United States, and a resident of the town of Evanston, in the county of Cook and State of Illinois, have invented certain new and useful Improvements in Mowers and Harvesting-Machines; and I do hereby declare that the following is a full, clear, and exact description of the same, reference being had to the accompanying drawings, and to the numerals of reference marked thereon, which form a part of this specification.

This invention relates to an improved reaper unit for removable attachment upon automobiles, mowers, harvesting machines or other vehicles.

It is an object of this invention to provide a mowing unit adapted to be removably attached to the chassis of an automobile or to the framework of any suitable type of farming vehicle, either to the rear of the driving wheels of said automobile or vehicle, or at a convenient location in front of said driving wheels to be driven from the power plant of the automobile or vehicle.

It is an object of my invention to provide a mowing unit adapted to be removably attached to the chassis of an automobile and which is driven from the power plant of the automobile.

It is further an object of my invention to provide a device of the class specified in which an endless cutting band is provided in lieu of the reciprocating cutting mechanism heretofore in use, adapting the machine being operated at a greater rate of speed to thereby cut a larger amount of material than is possible with the devices heretofore in use.

It is also an object of this invention to provide a flexible band cutting mechanism.

It is furthermore an object of my invention to provide a cutting mechanism which is adapted to automatically swing out of operative position when encountering an obstruction dangerous to the natural operation of the machine to thereby prevent breakage of the mechanism.

It is further an object of this invention to provide a cutting mechanism which may be swung into a position out of use so as to occupy a space of less width.

It is an important object of my invention to provide a rotary band cutting mechanism and means for both varying the pitch of the band in cutting and to vary the elevation of the mechanism to cut the desired distance above the ground.

Other and further important objects of this invention will be apparent from the disclosures in the specification and drawings.

The invention (in a preferred form) is illustrated in the drawings and hereinafter more fully described.

On the drawings:

Figure 1 is a top plan view of a mowing unit embodying my invention, showing the same attached to the chassis of an automobile.

Fig. 2 is a rear elevation thereof.

Fig. 3 is a side elevation showing the cutting mechanism in vertical section.

Fig. 4 is a section on line 4—4 of Fig. 1.

Fig. 5 is a section on line 5—5 of Fig. 1.

Fig. 6 is a plan view of the lower lap of the cutting mechanism with parts of the housing broken away and omitted.

Fig. 7 is an enlarged fragmentary sectional detail taken through the cutter bar and teeth.

Fig. 8 is an enlarged sectional view on line 8—8 of Fig. 2.

Fig. 9 is a section on line 9—9 of Fig. 8.

Fig. 10 is an enlarged sectional detail of the release mechanism.

Fig. 11 is a section on line 11—11 of Fig. 10.

Fig. 12 is an enlarged vertical section taken through the release mechanism.

Fig. 13 is an enlarged fragmentary view of a modified form of cutting band.

As shown on the drawings:

Part of the chassis of an automobile is shown comprising frame members 1 and 2, front wheels 3, and a front axle 4. Secured to the frame is the power plant 5, from which a drive shaft 6, extends and is connected with the differential 7, secured to the differential axles 8 and 9, which are suspended from the frame members 1 and 2, by means of brackets 10.

The mowing unit comprises frame members 11 and 12, which are attached to frame members 1 and 2, at their forward ends and brackets or extension arms 13 and 14, are secured to the rear ends of the frame members 11 and 12, and are provided with bearings 14ᵃ and 15, on their outer ends in which an axle 16, is journaled, on the ends of which are secured the drive wheels 17 and 18. Integral with each of the brackets 13 and 14, is a forwardly directed bar 20, which, together with a hook 21, pivoted thereto, engages the differential axle housings, forming a strong construction.

A removable frame member is pivoted to axle 16, and comprises an arm 22, having a bearing clamp 23, on its outer end which is removably journaled on axle 16, and a yoke arm 24, provided with a bearing clamp 25, which is removably journaled on axle 16. The cutting mechanism hereinafter described is attached to said frame and for the purpose of elevating the same and consequently the cutting mechanism, a lever 26, is made integral with or rigidly secured to the bearing 25. Attached to the lever is a rod 27, the outer end of which is attached to an actuating lever 28, adapted to engage a toothed segment 29.

The driving mechanism comprises an annular internal gear 30, one secured to each of the drive wheels 17 and 18, with which mesh gears 31, secured on the differential shafts 8 and 9. A shaft 32, is journaled in the yoke arm 24, on which is secured a gear 33, which meshes with the annular gear 30, on drive wheel 17. Loosely journaled on shaft 32, is a sprocket wheel 34, and a sprocket wheel 35, is secured on a shaft 36. Trained around said sprocket wheels 34 and 35, is a sprocket chain 37, which drives the cutting mechanism in one direction. For the purpose of reversing the drive, a gear 38, is loosely journaled on shaft 32, and meshes with an idler gear 39, on a stud shaft 40. A sprocket wheel 41, is secured to stud shaft 40, and a sprocket chain 42, is trained therearound and around a sprocket wheel 43, on shaft 36. A suitable clutch member 44ª, is slidable on shaft 32, by means of which the sprocket wheel 34, or gear 38, is connected to shaft 32, to effect a drive in either direction.

Pivoted on the outer portion of shaft 36, which is extended beyond the frame, is a standard 44, and secured on the outer end of said shaft 36, is a bevel gear 45. The standard is provided with an upper and lower bearing 46 and 47, respectively, in which a stationary shaft 48, is rigidly secured. For the purpose of oscillating the standard 44, and thereby controlling the pitch of the cutting mechanism, a rod 49, is pivoted to a stud shaft 50, secured to the upper end of the standard, and said rod is connected to a lever 51, provided with a spring pressed detent adapted to engage a gear segment 52, mounted to the outside of the gear segment 29.

Journaled or rotatably mounted on the stationary shaft 48, is the cutting mechanism which comprises a three-sided housing 53. The housing comprises a shell of sheet metal which is reinforced by means of T-bars 54, 55 and 56. Integral with the T-bar 54, is a bracket 57, to which is secured a bearing 58 journaled on the shaft 48. A thrust bearing 59, is placed between the lower end of the bearing sleeve 58, and the bearing 47. A bearing 60 is secured to the upper end of T-bar 54, integral with the outer end of which is a sleeve 61, which rotatably engages the upper end of the housing to the shaft. Journaled in suitable bearings in each corner of the rectangular housing 53, are shafts 62, 63, 64 and 65, on which are secured pulley wheels 66, 67, 68 and 69, respectively. Trained around said pulley wheels is a steel band cutting mechanism which comprises an endless band 70, cut to provide cutting teeth 71, which are sharpened as is usual in mowing and harvesting machines. For the purpose of driving said band, a bevel pinion 72, is secured on the outer end of shaft 62, and meshes with bevel gear 45.

Rigidly secured to the bottom of the housing 53, is a guard bar 73, to which guard teeth 74, are secured, having the usual ledger blades 75, attached thereto. The guard bar 73, is recessed for the cutting band to travel therein and the teeth 71, pass through slots in the guard teeth, as is usual in mower construction. For the purpose of confining the cutter band in place to run smoothly, a retaining plate 76, is secured to the guard bar 73, by means of screw bolts 77, with the free edge 78, of said retaining plate disposed to provide sufficient space between the same and the recessed guard bar to receive the cutting band therethrough.

For the purpose of both permitting the cutting mechanism to be swung rearwardly back of the machine when not in use and also to permit automatic release of the cutting mechanism when encountering an obstruction, a casing or housing 79, is provided integral with sleeve 61, which, as before stated, is journaled on the stationary shaft 48. A cap 80, is keyed on shaft 48, and is therefore stationary with respect to said shaft. Interposed between said cap and housing and loosely journaled on the hubs thereof, is a member 81, having a stop 82, integral therewith which is adapted to engage against a stop 83, integral with the housing 79, and a strong spiral spring 84, normally holds said stops together, said spring having one end attached to the housing 79, and the other end to the movable member 81. An aperture 85, is provided in the cap 80, and two apertures 86, in member 81, which in certain positions are adapted to register and receive a pin 87, therethrough, for either preventing the casing 79 and member 81, from rotating together, or permitting the same to rotate together.

The operation is as follows:

The mowing or harvesting unit is removably attached to the chassis of an automobile, tractor or other source of draft, and upon being driven or advanced, the drive wheels 17 and 18, are rotated, thereby driving the mechanism for rotating the cutting band or mechanism. The cutting band is endless, and for this reason may be driven at a high rate of speed, enabling a much larger quantity of material to be cut than is possible with a reciprocating mechanism. Of course, if preferred, the teeth 71, may be separate teeth which are riveted to the band 70, in the usual manner, and as shown in Fig. 13, a flexible band or strip of belting 88, is used, and teeth 89, are attached thereto. It is therefore obvious that a great variety of flexible bands may be used, and details of construction may be varied through a wide range.

Actuation of the lever 28, vertically, adjusts the cutting mechanism to cut grass or grain at any desired height, and actuation of lever 51, varies the pitch of the cutting knives to obtain the best results under the existing conditions. When the knives on one edge become dull, the clutch is operated to reverse the rotation, thereby presenting the sharp edges of the knives for cutting. It is to be noted, however, that the cutting mechanism or band herein described will stay sharp a long time, as there are practically four times the number of knives used as in a reciprocating mechanism, and that at times, part of the knives are not cutting. This takes the continuous cutting strain off of every knife during a part of each rotation of the cutting band, for while the knives are continuously rotating, yet when they pass beyond the field of operation, the cutting strain is not exerted on the knives until they pass through the housing again into the field of operation.

Preferably, perhaps, a style of differential is used in which the power is given to the wheel exerting the greatest resistance, as for instance, the Bailey non-stall differential.

In cutting, the release mechanism is keyed by pin 87, in the position shown in Fig. 10. In this position, if the cutting mechanism becomes clogged or strikes an obstruction, the mechanism as a whole is thrown or swung rearwardly against the tension of the spring 84, out of the way. This prevents breakage, and the operation is entirely automatic. After the cause of obstruction is removed, the cutting mechanism automatically swings back to normal which position is reached when the stops 82 and 83, contact. If it is desired to swing the cutting mechanism into inoperative position at the rear of the machine, the pin 87, is removed, and the cutting mechanism as a whole is manually rotated around the stationary shaft 48, into a position wherein the other of said apertures 86, in the member 81, is in position to register with aperture 85, into which the pin 87, is inserted, locking the mechanism in this position. In this adjustment, the relative position of member 81, and housing 79, remains the same, and the tension of the spring is not affected.

In view of the high speed of drive made possible by the use of the endless cutter, the guard teeth may be omitted if not required. It will also be understood that the mowing unit may be removably secured in position upon the automobile chassis, intermediate the driving wheels 17—18, and the front wheels 8, if desired, or in any other position which may prove more practicable, permitting the endless cutter mechanism to be used more efficiently.

Numerous other changes may be made and details may be varied through a wide range without departing from the principles of my invention, and I therefore do not purpose limiting my application for patent otherwise than necessitated by the prior art.

I claim as my invention:

1. In a mowing unit, drive wheels forming a part thereof, a pivoted frame, a housing rotatably supported by the frame, a horizontal guard bar attached to the bottom of the housing, guard teeth thereon, an endless cutting mechanism adapted to move through the housing and guard teeth, mechanism operated by the drive wheels for actuating the cutting mechanism, a casing associated with said housing, a stop member in said casing, resilient means in said casing connected with said casing and with said stop member adapted to automatically release said housing and cutting mechanism at a predetermined pressure to swing out of the way of an obstruction causing such pressure.

2. The combination with an automobile, of a mowing unit comprising a frame, drive wheels forming a part of the mowing unit and supporting the rear end of the automobile and receiving a drive therefrom, a vertical shaft supported on said frame, a housing pivotally mounted on said shaft, an endless cutting mechanism in said housing, driving means connected with said drive wheels for operating said cutting mechanism, a casing on said shaft connected to said housing, a cap for said casing keyed on said shaft, a stop mechanism on said shaft between said casing and said cap, and a spring in said casing connected to said casing and to said stop mechanism to permit automatic release of the housing and said cutting mechanism when an obstruction is encountered.

3. The combination with a mowing unit, of a cutting mechanism adjustably mounted on said unit, a movable casing connected with said cutting mechanism, a stationary cap therefor, a stop in said casing, a movable stop member disposed between said casing and cap, a resilient member secured to said casing and to said stop member for holding the casing stop and said stop member engaged with each other, and means removably connected with said cap and with said stop member for controlling the movements of said casing and said stop member with respect to each other.

In testimony whereof I have hereunto subscribed my name in the presence of two subscribing witnesses.

ALBERT EUGENE COOK.

Witnesses:
 EARL M. HARDINE,
 CHARLES W. HILLS, Jr.